US007065343B2

(12) United States Patent
Pelaez et al.

(10) Patent No.: US 7,065,343 B2
(45) Date of Patent: Jun. 20, 2006

(54) METHOD AND SYSTEM FOR SYNCHRONIZATION OF NETWORK-BASED VOICEMAIL AND MULTIMEDIA MAIL

(75) Inventors: Mariana Benitez Pelaez, Naperville, IL (US); Victoria Marie Halsell, Aurora, IL (US); Charu Verma, Darien, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 306 days.

(21) Appl. No.: 10/768,319

(22) Filed: Jan. 30, 2004

(65) Prior Publication Data

US 2005/0170816 A1 Aug. 4, 2005

(51) Int. Cl.
*H04Q 7/22* (2006.01)
*H04M 1/663* (2006.01)
*H04M 1/725* (2006.01)

(52) U.S. Cl. .............................. 455/412.2; 455/412.1; 455/413; 455/414.1; 455/419; 455/418; 455/420; 455/556; 455/557; 455/566; 455/415; 709/206; 710/73; 710/212; 379/88.13; 379/88.12; 379/88.16; 379/88.18

(58) Field of Classification Search ............. 455/412.2, 455/412.1, 413, 414.1, 419, 418, 420, 556, 455/557, 566, 415; 710/73, 212; 709/206
See application file for complete search history.

(56) References Cited

U.S. PATENT DOCUMENTS

| 5,960,393 A | 9/1999 | Cohrs et al. |
| 6,546,262 B1 * | 4/2003 | Freadman .................... 455/557 |
| 6,601,031 B1 | 7/2003 | O'Brien |
| 6,751,298 B1 * | 6/2004 | Bhogal et al. ........... 379/88.13 |

* cited by examiner

*Primary Examiner*—William Trost
*Assistant Examiner*—Chuck Huynh

(57) ABSTRACT

A method of synchronizing multimedia telecommunications network-based voicemail and multimedia mail messages with a wireless communications device and an external message recording device. The method includes connecting the wireless communications device to the external device, establishing a call between the wireless communications device and a voicemail/multimedia mail server in the network, exchanging information between the wireless communications device and the voicemail/multimedia mail messages about the subscriber's messages, which messages may be stored on the external device and the voicemail/multimedia mail server, determining the status of the subscriber's messages. If there is at least one new message for the subscriber on the server, then any new messages are downloaded to the external device and the server is updated. If there are no new messages for the subscriber on the server, then a message is played for the subscriber indicating that there are no new messages. If there is at least one message has been deleted by the subscriber using the external device, then the corresponding messages are deleted from the server. If at least one message has been modified by the subscriber on the external device, then any modified messages are uploaded to the server. Finally, the call is released.

18 Claims, 4 Drawing Sheets

METHOD AND SYSTEM FOR SYNCHRONIZATION OF NETWORK-BASED VOICEMAIL AND MULTIMEDIA MAIL

BACKGROUND

The present invention relates generally to the art of telecommunications, and, more particularly, to a method and system for synchronizing network-based voicemail and multimedia mail to an external device.

Wireless communication networks, which are well known, allow mobile devices to communicate with each other and other networks, such as the Internet and the public switched telephone network (PSTN). First and second generation wireless telephone systems are generally constrained in the amount of bandwidth available for communication, which limits capacity and also the types of services that can be provided. Third generation (3G) wireless systems, which are being developed through the 3rd Generation Partnership Project (3GPP), hold the promise of greater bandwidth, thereby increasing capacity and allowing for enhanced services, such as multimedia services.

3GPP is the new worldwide standard for the creation, delivery, and playback of multimedia over new, high-speed wireless networks. 3GPP enables the free sharing of multimedia files between a variety of devices, including cell phones, personal digital assistants (PDAs), and notebook and desktop computers. 3GPP devices include, in addition to a voice communication interface, capability for communication of data and display of data, including video.

Various features and services have been developed and made available to wireless customers. For example, voicemail systems, which are well known, allow callers the option to leave voicemail messages for parties who are unavailable. In order to leave a message, the caller is typically prompted to enter a command on a keypad of a handset or wait for a specified tone, or both. The voicemail system then records the voicemail message for a predetermined amount of time or until the caller ends the call. Multimedia mail is the exchange of messages consisting of at least two media within a message using the mail transport service. The types of media include text, images, voice and video. Proposed third generation (3G) wireless systems will permit wireless users the capability to leave multimedia messages in multimedia mail systems similar to that of voicemail systems.

The only way for a wireless subscriber to retrieve voicemail and/or multimedia mail messages is by connecting directly to the voicemail server in the network through the wireless device or through another telephone device. However, the voicemail messages will remain on the voicemail server (until they are deleted), which limits the ability of the subscriber to manipulate and replay the messages as needed. The subscriber must connect to the voicemail server each time he or she wants to listen to a message. Thus, there exists a need for a convenient method and system that allows a subscriber to synchronize the subscriber's voicemail (and multimedia mail) messages with an external device, such as an intelligent answering machine, whereby the messages can be readily modified, saved, replayed, and deleted by the subscriber.

SUMMARY OF THE INVENTION

In accordance with an aspect of the present invention, a method of synchronizing multimedia telecommunications network-based voicemail and multimedia mail messages with a wireless communications device and an external message recording device is provided. The method includes connecting the wireless communications device to the external device, establishing a call between the wireless communications device and a voicemail/multimedia mail server in the network, exchanging information between the wireless communications device and the voicemail/multimedia mail messages about the subscriber's messages, which messages may be stored on the external device and the voicemail/multimedia mail server, determining the status of the subscriber's messages. If there is at least one new message for the subscriber on the server, then any new messages are downloaded to the external device and the server is updated. If there are no new messages for the subscriber on the server, then a message is played for the subscriber indicating that there are no new messages. If there is at least one message has been deleted by the subscriber using the external device, then the corresponding messages are deleted from the server. If at least one message has been modified by the subscriber on the external device, then any modified messages are uploaded to the server. Finally, the call is released.

In accordance with another aspect of the present invention, a system for synchronizing multimedia telecommunications network-based voicemail and multimedia mail messages with a wireless communications device and an external message recording device is provided. The system includes means for connecting the wireless communications device to the external device, means for establishing a call between the wireless communications device and a voicemail/multimedia mail server in the network, means for exchanging information between the wireless communications device and the voicemail/multimedia mail messages about the subscriber's messages, which messages may be stored on the external device and the voicemail/multimedia mail server, and means for determining the status of the subscriber's messages. The system further includes means for downloading any new messages on the server to the external device, means for playing a message for the subscriber indicating that there are no new messages on the server, means for uploading any modified messages to the server, and means for releasing the call.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

It is to be understood that the specific methods and systems illustrated in the attached drawings and described in the following specification are simply exemplary embodiments of the inventive concepts defined in the appended claims. Therefore, specific examples and characteristics related to the embodiments disclosed herein are not to be considered as limiting, unless the claims expressly state otherwise.

For simplicity and ease of reference, the acronyms listed below shall be used in the specification to refer to structural and/or functional network elements, relevant telecommunications standards, protocols and/or services, terminology, etc., as they are commonly known in the telecommunications art, except to the extent they have been modified in accordance with aspects of the present invention.

Figure 1:
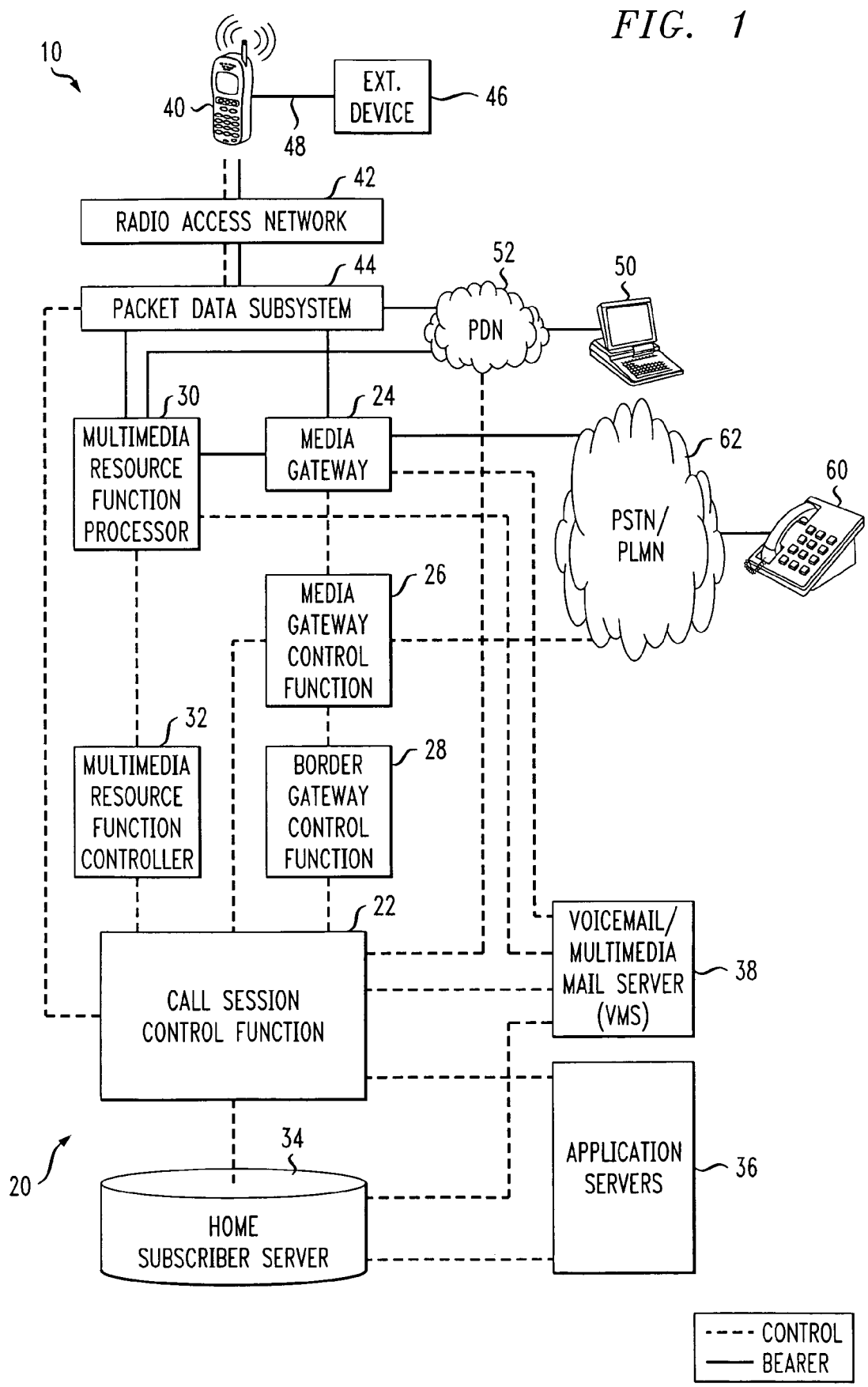
FIG. 1 is a block diagram showing a known multimedia telecommunications environment suitable for practicing aspects of the present invention.

3G—3$^{rd}$ Generation
3GPP—3$^{rd}$ Generation Partnership Project
3GPP2—3$^{rd}$ Generation Partnership Project 2
AH—Address Handling
AS—Application Server
BGCF—Border/Breakout Gateway Control Function
CCF—Call Control Function
CDMA—Code Division Multiple Access
CSCF—Call Session Control Function
HLR—Home Location Register
HSS—Home Subscriber Server
ICGW—Incoming Call Gateway
IMS—IP Multimedia Subsystem
IP—Internet Protocol
MGCF—Media Gateway Control Function
MGW—Media Gateway
MRFC—Multimedia Resource Function Controller
MRFP—Multimedia Resource Function Processor
PDN—Public Data Network
PDS—Packet Data Subsystem
PLMN—Public Land Mobile Network
PSDN—Packet Switched Data Network
PSTN—Public Switched Telephone Network
RAN—Radio Access Network
SIP—Session Initiation Protocol
SPD—Serving Profile Database
UMTS—Universal Mobile Telecommunications System
VMS—Voicemail/Multimedia Mail Server
WLAN—Wireless Local Area Network FIG. 1 is a block diagram of a known multimedia telecommunications network 10 suitable for implementing aspects of the present invention. The multimedia telecommunications network 10 provides users with a variety of options for communication. Users are able to transmit and receive multimedia communications, including audio, voice, video, and all types of data. The multimedia telecommunications network 10 provides access to data networks, such as the Internet, and public telephone networks, including wireless networks. It is to be understood, however, that other such networks may be suitable for implementing aspects of the present invention.

The multimedia telecommunications network 10 preferably includes an IP multimedia subsystem (IMS) 20, which is known in the art. The IMS 20 relates to a technology standardized by the 3$^{rd}$ Generation Partnership Project, also known as 3GPP, and is used to join mobile communication with IP technologies by adding the ability to deliver integrated voice and data services over the IP-based packet switched network. IMS services are based on the Session Initiation Protocol (SIP), which is the signaling protocol standard for next-generation 3GPP mobile wireless networks. The IMS 20 typically includes any number of system elements, such as a call session control function (CSCF) 22, media gateways (MGW) 24, a media gateway control function (MGCF) 26, a border gateway control function (BGCF) 28, a multimedia resource function processor (MRFP) 30, a multimedia resource function controller (MRFC) 32, a home subscriber system (HSS) 34, application servers (AS) 36, and a voicemail/multimedia mail server (VMS) 38. As is known in the art, the IMS 20 manages call sessions and provides and administers packet switching for multimedia communications within the network 10.

A first communication device 40 is shown in FIG. 1. The first communication device 40 is preferably a wireless device, which includes a user interface and an interface for coupling to a radio access network (RAN) 42. The user interface of the communication device 40 is typically referred to as terminal equipment and generally includes an audio interface, such as a microphone and speakers, a visual interface, such as a display, and a user input interface, such as a keyboard or touch pad. The interface for coupling to the RAN 42 is typically referred to as a mobile terminal and generally includes an over-the-air interface for transmitting and receiving data. The over-the-air interface of the communication device 40 is used to communicate with base stations in the RAN 42. Preferably, the communication device 40 and the base stations in the RAN 42 communicate over-the-air using a packet-based protocol. A packet data subsystem (PDS) 44 couples the RAN 42 with the IMS 20 and the public data network (PDN) 52 in the usual manner.

The first communication device 40 may be operatively connected to an external voicemail/multimedia mail recording device 46, such as an intelligent answering machine, a notebook computer, a PDA, or a similar device. The connection 48 may be wireless (infra-red, bluetooth, etc.) or wireline (via a cable).

A second communication device 50 is shown as a laptop or notebook computer operatively connected to the IMS 20 via the PDN 52. The communication device 50 optionally employs a wireless local area network (WLAN) or wire line, in the usual manner, to operatively connect to the PDN 52. A third communication device 60 is shown as an ordinary telephone equipped to handle only voice communications. The communication device 60 is operatively connected to the IMS 20 via the public switched telephone network/ public land mobile network (PSTN/PLMN) 62.

Only three communication devices (40, 50, and 60) are shown in FIG. 1 for the purpose of simplifying the diagram. However, it is to be appreciated that any number of such devices are typically situated in the multimedia telecommunications network 10. Additionally, while each is depicted as a specific type of communication device, other like devices may also be incorporated.

With continuing reference to FIG. 1, the bearer paths that carry (or relay) the communication traffic and/or user information for transmission from one terminal to another, which are known in the art, are shown as solid lines. Control paths carry associated signaling and/or control commands (or messages) to and between appropriate network elements for the purpose of managing and routing call sessions. The control paths are shown as dashed lines in FIG. 1. Suitably, SIP and other known protocols are used on the control and bearer paths, respectively. For example, the known Media Gateway Control Protocol ITU-T H.248 protocol is suitably employed for media gateway control. The CSCF 22, the BGCF 28, the MGCF 26, the MRFC 32 and the AS 36 comprise the call control and signaling functionality for the IMS 20, while the bearer paths interface with the MRFP 30 and the MGW 24 to provide and support interconnectivity to external networks and/or subsystems, such as the PDS 44, the PDN 52 and the PSTN/PLMN 62.

The CSCF 22 supports and controls multimedia sessions. The CSCF 22 invites elements such as the MGCF 26 and the MRFC 32 to call sessions to control the establishment and maintenance of bearer paths for call sessions by adding, modifying or deleting appropriate bearer paths for respective call sessions. The CSCF 22 is the signaling entity for call session control. It manages sessions by using SIP and/or other appropriate call/session establishment protocols, and it provides features and services and coordinates with other network elements for session control, service control and resource allocation.

The CSCF 22 may provide the following functionalities: incoming call gateway (ICGW), call control function (CCF), serving profile database (SPD), and address handling (AH). By functioning as ICGW, the CSCF 22 acts as a call session entry point and routes incoming calls. The CCF generally refers to call setup/termination and state/event management. The CSCF 22 interacts with the MGCF 26 for calls to/from the PSTN/PLMN 62 and with the BGCF 28 for calls to the PSTN/PLMN 62 to determine the appropriate MGCF 26 to use. It also controls the MRFP 30 via the MRFC 32, which interprets information or signals coming from the CSCF 22 and controls the MFRP 30, in order to support conferencing and other multi-party services. SIP level registrations from subscribers are processed with the CCF. The CSCF 22 may also provide service trigger mechanisms to the AS 24 to invoke services provided thereby, either locally, at the AS 24, or elsewhere. It also reports call events for billing, auditing, intercept or other purposes, and may query the AH function to check whether a requested communication is allowed given the current subscription. The SPD function refers to the interaction of the CSCF 22 with the HSS 34 to receive and cache user profile information. The AH function refers to address analysis, translation, modification (when appropriate) and mapping.

The MGW 24 acts as a bearer path interface between different transport networks, and provides translation resources and resources for modifying the bearer stream (e.g., encoding, transcoding, compression, packetization, depacketization, etc.). The bearer path control elements include the MGCF 26, and the MRFC 32. These elements provide the flexibility to control the bearer by adding, modifying or deleting bearers on the MGW 24/MRFP 26 respectively that are used by the users' services. More particularly, the MGW 24 interacts with the MGCF 26, which interprets signaling coming from the CSCF 22 and controls the MGW 24 to achieve resource allocation, bearer path control, and payload processing. The MGCF 26 communicates with the CSCF 22 in order to control the call state for media channels on one or more MGWs and performs conversions between Legacy and 3G Universal Mobile Telecommunications System (UMTS)/Code Division Multiple Access (CDMA) network call control protocols. Similarly, the MRFC 32 controls the media stream resources in the MRFP 30, which also acts as a bearer path interface between the IMS 20 and external networks and/or subsystems, while being able to provide for conferencing or multiple party communications or other more advanced media services (relative to the MGW 24). The BGCF 28 selects the proper MGCF 26.

The HSS 34 is coupled to the CSCF 22 via a data link. The HSS 34 includes subscriber profile information, including information traditionally associated with a home location register (HLR) for a mobile subscriber. Suitably, the HSS 34 stores information such as user identification, user security information, including network access control information for authentication and authorization, user location information for user registration and locating, and user profiles, including identification of the services subscribed to and other service specific information.

The AS 36 are preferably coupled to the IMS 20 for use in interaction with the communication devices 40, 50, 60. In particular, the CSCF 22 is coupled to the AS 36 via a data link. Also, the HSS 34 is preferably coupled to the AS 36. A myriad of services and applications may reside in or be coupled to the AS 36.

The VMS 38 is preferably coupled to the IMS 20 for use in interaction with the communication devices 40, 50, 60 and to the CSCF 22 via a data link. Also, the VMS 38 is preferably coupled to the HSS 34. There are additional data links from the VMS 38 to the MGW 24 and to the MRFP 30. The VMS 38 preferably provides voicemail and multimedia mail services for subscribers.

In the preferred embodiment, the CSCF 22, the MGCF 26, the MGW 24, the HSS 34, the AS 36, and the VMS 38 are all processor-based devices with data link interfaces for coupling together as described above and shown in FIG. 1. These devices include one or more processors that execute programs to implement the functionality described herein and generally associated with 3GPP/3GPP2 wireless systems. The flexibility of these processor-based systems permits ready integration into these systems of a voicemail/multimedia mail message synchronization method and system in accordance with the present invention. It should be noted, however, that as utilized herein, the term "processor" is not intended to refer exclusively to hardware capable of executing software.

Figure 2:
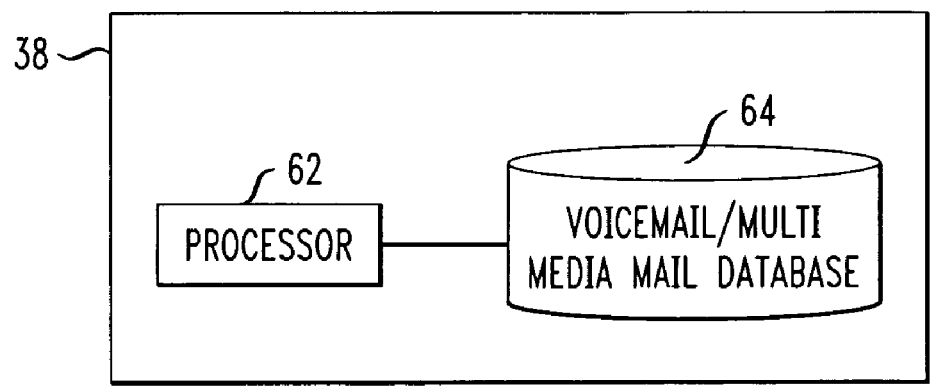
FIG. 2 is a block diagram of the voicemail/multimedia mail server, in accordance with an embodiment of the present invention.

Referring now to FIG. 2, the VMS 38 preferably includes a processor 62 for implementing the voicemail/multimedia mail message synchronization method and a database 64 linked to the processor 62 for storing subscriber voicemail/multimedia mail messages and other data.

Figure 3:
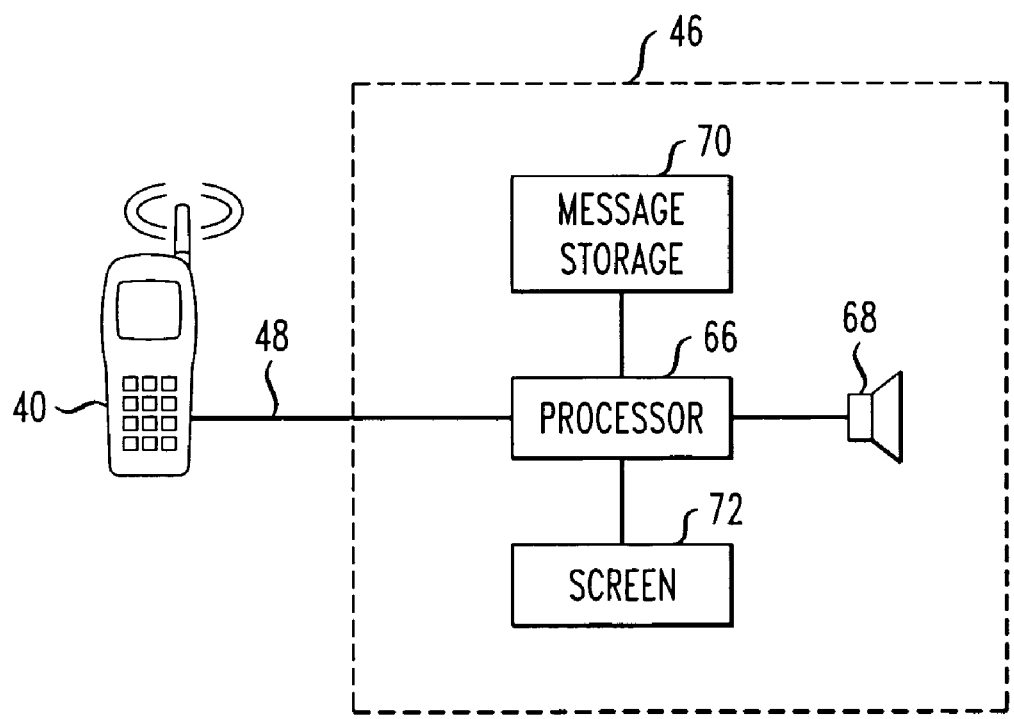
FIG. 3 is a block diagram of the external device, in accordance with an embodiment of the present invention.

Referring now to FIG. 3, the components in the external device 46 preferably include a device control processor 66 for directing the operation of the various functioning components of the external device 46, a loudspeaker 68 for playing audio messages such as voicemail messages and prompts, a message storage unit 70 for storing voicemail and multimedia mail messages in an appropriate format, which format may be analog or digital, and a visual screen 72 (e.g. an LCD Screen) for viewing multimedia mail messages, as well as prompts and text messages from the external device 46. Thus, the external device 46 is suitable for all types of voicemail/multimedia mail messages, including text, images, voice, and video. Alternatively, the external device 46 may include a speech recognition system (not shown) for receiving and processing input speech from the caller.

Figure 4:
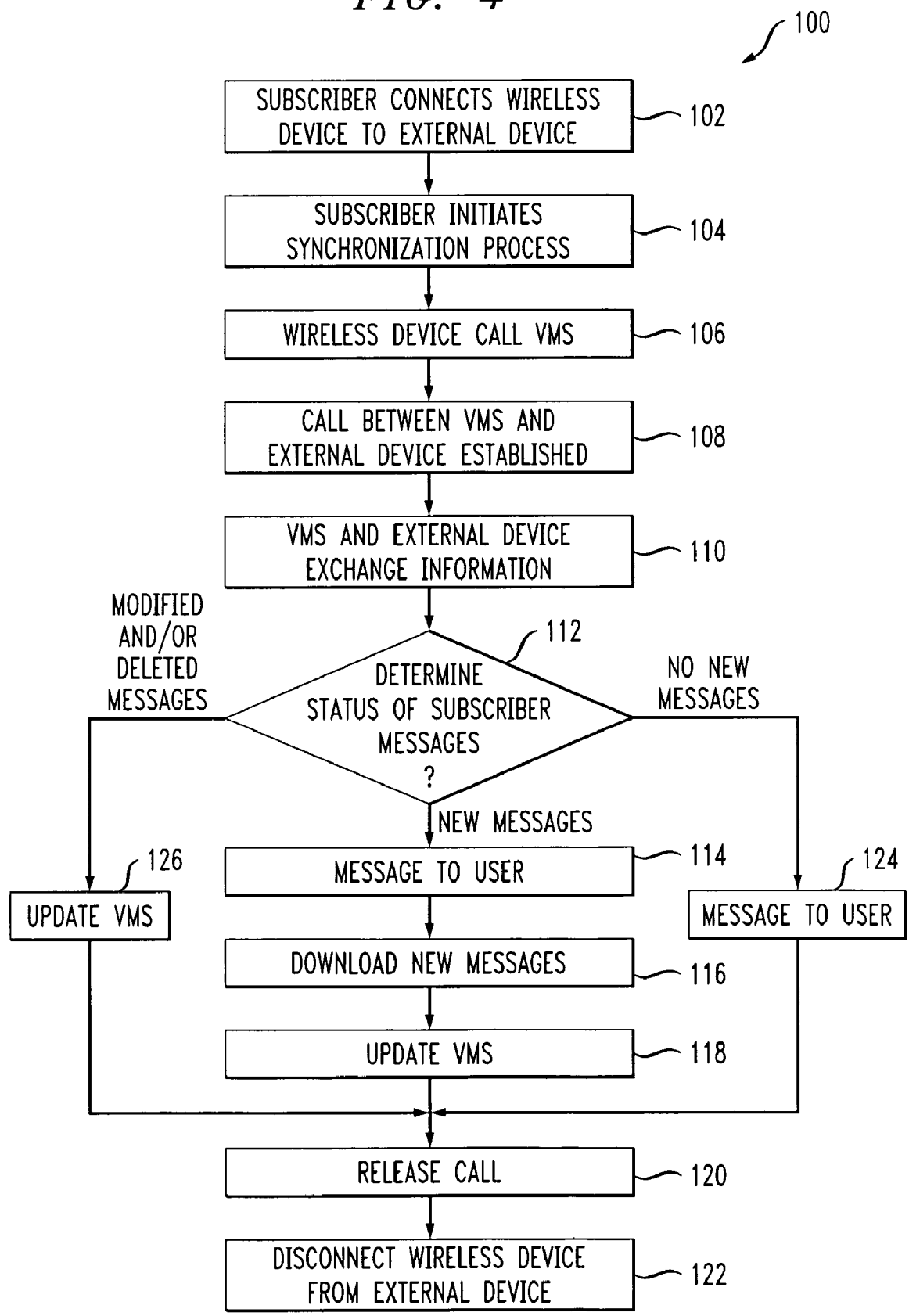
FIG. 4 is a flow diagram useful in understanding an embodiment of the present invention.

FIG. 4 is a flow diagram depicting a preferred method 100 of synchronizing voicemail and multimedia mail messages received from the network 10 to the external voicemail/multimedia mail device 46. The method 100 is preferably implemented through software in the VMS 38. However, the method 100 may also be implemented through software distributed throughout the network 10.

Initially, in step 102, a wireless subscriber connects the wireless communication device 40 to the external device 46 in order to initiate the voicemail/multimedia mail message synchronization process. The connection 48 between the wireless device 40 and the external device 46 may be wireless (e.g., infra-red, bluetooth, etc.) or wireline (e.g., via a cable). Next, the subscriber initiates the synchronization process through the external device 46, for example, by pressing a button on the device 46 (not shown) or other known activation means such as voice activation (step 104).

The external device 46 then sends a signal to the wireless device 40, requesting a call to the VMS 38 in the usual manner (step 106). Preferably, the wireless device 40 automatically dials the phone number of the subscriber's voicemail/multimedia mail service. The call is established in the usual manner (step 108). That is, the VMS 38 answers the call, and based upon the calling ID, accesses the appropriate subscriber information in the database 64 for further processing.

During the call, the external device 46 and the VMS 38 exchange data/information concerning the status of the subscriber's voicemail/multimedia mail messages (step 110). The external device 46 and the VMS 38 then determine the status of the subscriber's messages based upon the exchange of data (step 112). The status of the messages may be one of the following: (1) there are new messages on the VMS 38, (2) there are no new messages on the VMS 38, or (3) messages on the external device 46 have been modified and/or deleted. Each scenario will be addressed separately.

If there are new messages on the VMS 38, then the external device 46 notifies the subscriber of the number of new messages through the speaker 68 and/or the screen 72 (step 114). This notification can be in the form of text and/or speech message(s), as known in the art. For example, the external device 46 may play a message stating, "You have three new messages." Next, the subscriber's messages are automatically downloaded from the database 64 of the VMS 38 to the external device 46 in the usual manner and stored in the message storage unit 70 of the external device (step 116). Once all of the new messages have been downloaded, the database 64 of the VMS 38 is updated (step 118), and the call between the VMS 38 and the external device 46 is released in the usual manner (step 120). The subscriber may then disconnect the mobile device 40 from the external device 46 (step 122). Now that the basic synchronization process is complete, the subscriber may use the external device 46 to play, modify, and/or delete any or all of the messages.

If there are no new messages on the VMS 38, then the external device 46 notifies the subscriber of this status via a text and/or speech message (step 124). For example, the external device 46 may play a message stating, "You have no new messages." Then, the call is released (step 120), and the subscriber may disconnect the wireless device 40 from the external device 46 (step 122).

If the subscriber has deleted and/or modified messages on the external device 46, then the VMS 38 is updated accordingly (step 126). That is, any deleted messages are deleted from the VMS 38 and any modified messages are uploaded from the external device 46 to the VMS 38. In the case of modified messages, the subscriber may have several options with respect to the handling of the original messages. For example, all original messages may be deleted automatically from the VMS 38, or the external device 46 may ask the subscriber whether the corresponding original message(s) should be deleted from the VMS 38. The subscriber may then choose delete/undelete for each message. The external device 46 sends this information to the VMS 38, which, in turn, would perform the appropriate action (i.e., either delete the original message or save the original message). Once the database 64 of the VMS 38 has been updated, the call is released (step 120), and the wireless device 40 may be disconnected from the external device 46 (step 122).

Preferably, the database 64 will store a profile for each subscriber. The profile may include the voicemail ID number, including the subscriber's user ID and password; whether to delete all messages from the server after they have been downloaded; whether to keep the original message when a message has been modified; whether to automatically synchronize every X minutes; as well as other important information for the subscriber.

Figure 5:
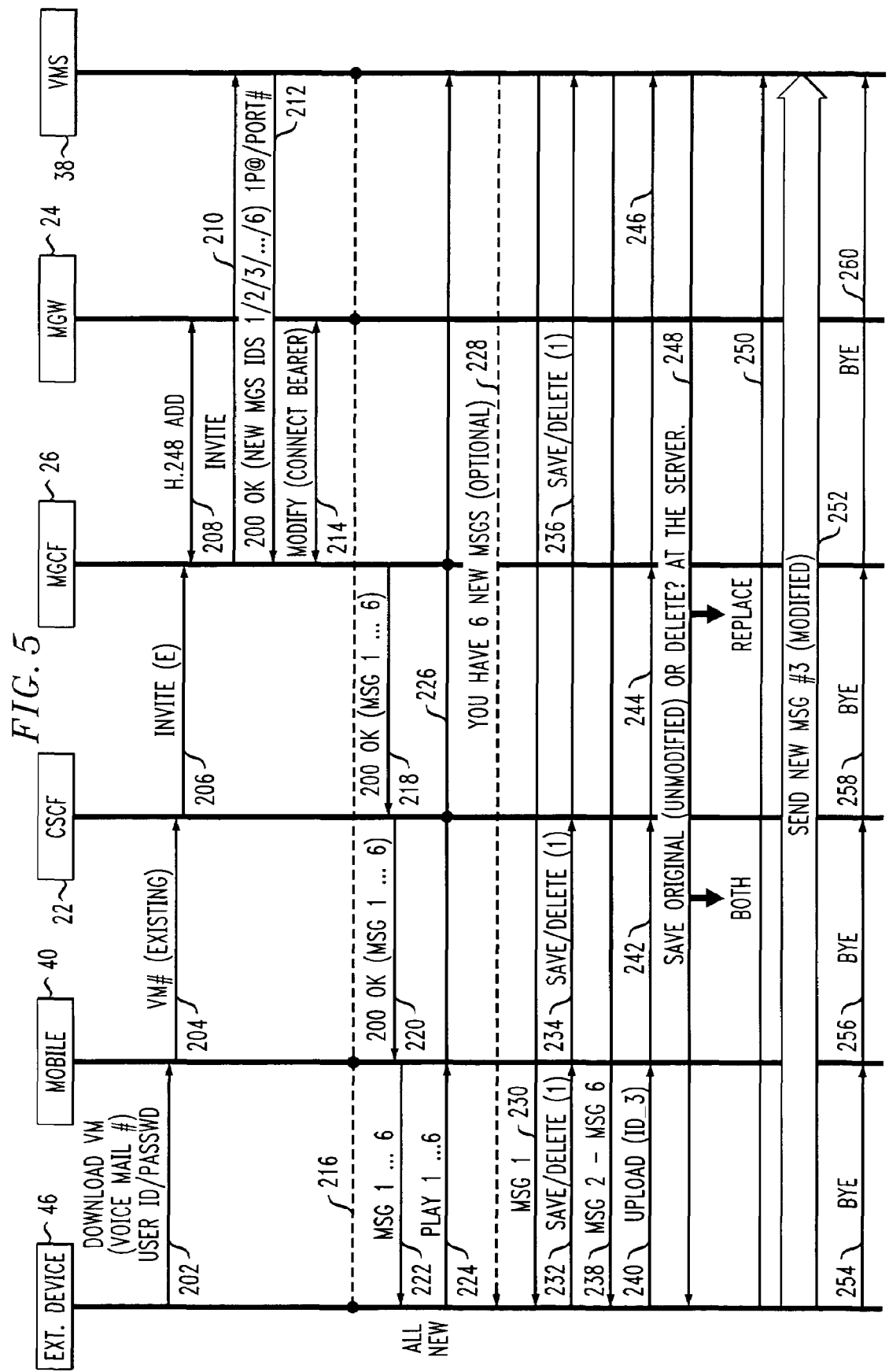
FIG. 5 is a call flow scenario according to an embodiment of the present invention.

FIG. 5 is an example of a call flow scenario for the synchronization of new voicemail/multimedia mail messages with the external device 46. In this example, it is assumed that the wireless device 40 is connected to the external device 46 and that the subscriber has initiated the synchronization process. The external device 46 sends a download voicemail message, which would include the voicemail number, user ID, and password, to the wireless device 40 (202). The wireless device 40 sends the voicemail number to the CSCF 22 (204), which, in turn, sends an invite message to the MGCF 26 (206). The MGCF 26 sends an H.248 add request to the MGW 24, which responds with an H.248 add acknowledgement (208). The MGCF 26 sends an invite message to the VMS 38 (210), which sends the new voicemail message IDs to the MGCF 26 (212). In this example, there are six new messages. A modify request is sent from the MGCF 26 to the MGW 24, which responds with a modify acknowledgement (214). At this point, the bearer link between the external device and the VMS 38 is connected (216).

The six new message IDs are then sent from the MGCF 26 to the external device 46 (218, 220, 222). The external device 46 forwards a message through the wireless device 40 to the VMS 38 to play the messages (224, 226). The external device 46 may automatically play "You have six new messages" for the subscriber (228). The VMS 38 then sends the first new message to the external device 46 (230). The external device 46 plays the message, and the subscriber either saves or deletes the message. A save/delete message is forwarded to the VMS 38 (232, 234, 236). This process is repeated for the other five messages on the VMS 38 (238).

In this example, the subscriber has modified the third message via the external device 46. The ID of the modified third message (ID_3) is uploaded to the VMS 38 (240, 242, 244, 246). The VMS 38 prompts the subscriber as to whether the original message should be saved or deleted (248). A save/delete message is sent to the VMS 38 (250). The modified third message is then uploaded to the VMS 38 (252). Finally, the call is released (254, 256, 258, 260).

Thus, the invention allows the user of a wireless device having network-based voicemail and/or multimedia mail messages to synchronize the messages to an external device, such as an intelligent answering machine, whereby the user has greater flexibility to manipulate and replay messages.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. In a multimedia telecommunications network, a method of synchronizing network-based voicemail and multimedia mail messages with a wireless communications device and an external message recording device, the method comprising the steps of:

connecting the wireless communications device to the external device;

establishing a call between the wireless communications device and a voicemail/multimedia mail server in the network;

exchanging information between the wireless communications device and the voicemail/multimedia mail messages about the subscriber's messages, which messages may be stored on the external device and the voicemail/multimedia mail server;

determining the status of the subscriber's messages;

where there is at least one new message for the subscriber on the server, downloading any new messages to the external device and updating the server;

where there are no new messages for the subscriber on the server, playing a message for the subscriber indicating that there are no new messages;

where at least one message has been deleted by the subscriber using the external device, deleting any corresponding messages from the server;

where at least one message has been modified by the subscriber on the external device, uploading any modified messages to the server; and releasing the call.

2. The method defined in claim 1, further comprising the step of activating the external device.

3. The method defined in claim 1, further comprising the step of disconnecting the wireless communications device from the external device.

4. The method defined in claim 1, wherein the voicemail/multimedia mail server includes a processor and a database for storing subscriber messages and other subscriber data.

5. The method defined in claim 1, further comprising the step of storing in a database at the voicemail/multimedia mail server a profile for the subscriber, the profile including a voicemail ID number; the subscriber's user ID and password; whether to delete all messages from the server after they have been downloaded to the external device; whether to keep the original message when a message has been modified; and whether to automatically synchronize at predetermined intervals.

6. The method defined in claim 1, wherein the network includes an IP Multimedia Subsystem for managing calls and administering packet switching for multimedia communications in the network.

7. The method defined in claim 2, further comprising the steps of:

disconnecting the wireless communications device from the external device; and storing in a database at the voicemail/multimedia mail server a profile for the subscriber, the profile including a voicemail ID number; the subscriber's user ID and password; whether to delete all messages from the server after they have been downloaded to the external device; whether to keep the original message when a message has been modified; and whether to automatically synchronize at predetermined intervals.

8. The method defined in claim 7, wherein the network includes an IP Multimedia Subsystem for managing calls and administering packet switching for multimedia communications in the network.

9. The method defined in claim 7, wherein the external device includes a device control processor for directing the operation of the various functioning components of the external device, a loudspeaker for playing audio messages including voicemail messages and prompts, a message storage unit for storing voicemail and multimedia mail messages, which format may be analog or digital, and a visual screen for viewing multimedia mail messages, as well as prompts and text messages from the external device.

10. In a multimedia telecommunications network, a system for synchronizing network-based voicemail and multimedia mail messages with a wireless communications device and an external message recording device, the system comprising:

means for connecting the wireless communications device to the external device;

means for establishing a call between the wireless communications device and a voicemail/multimedia mail server in the network;

means for exchanging information between the wireless communications device and the voicemail/multimedia mail messages about the subscriber's messages, which messages may be stored on the external device and the voicemail/multimedia mail server;

means for determining the status of the subscriber's messages;

means for downloading any new messages on the server to the external device and updating the server;

means for playing a message for the subscriber indicating that there are no new messages on the server;

means for uploading any modified messages to the server; and means for releasing the call.

11. The system defined in claim 10, further comprising means for activating the external device.

12. The system defined in claim 10, further comprising means for disconnecting the wireless communications device from the external device.

13. The system defined in claim 10, wherein the voicemail/multimedia mail server includes a processor and a database for storing subscriber messages and other subscriber data.

14. The system defined in claim 10, further comprising a database at the voicemail/multimedia mail server for storing a profile for the subscriber, the profile including a voicemail ID number; the subscriber's user ID and password; whether to delete all messages from the server after they have been downloaded to the external device; whether to keep the original message when a message has been modified; and whether to automatically synchronize at predetermined intervals.

15. The system defined in claim 10, wherein the network includes an IP Multimedia Subsystem for managing calls and administering packet switching for multimedia communications in the network.

16. The system defined in claim 11, further comprising the steps of:

means for disconnecting the wireless communications device from the external device; and a database at the voicemail/multimedia mail server for storing a profile for the subscriber, the profile including a voicemail ID number; the subscriber's user ID and password; whether to delete all messages from the server after they have been downloaded to the external device; whether to keep the original message when a message has been modified; and whether to automatically synchronize at predetermined intervals.

17. The system defined in claim 16, wherein the network includes an IP Multimedia Subsystem for managing calls and administering packet switching for multimedia communications in the network.

18. The system defined in claim 16, wherein the external device includes a device control processor for directing the operation of the various functioning components of the external device, a loudspeaker for playing audio messages including voicemail messages and prompts, a message storage unit for storing voicemail and multimedia mail messages, which format may be analog or digital, and a visual screen for viewing multimedia mail messages, as well as prompts and text messages from the external device.

* * * * *